Feb. 26, 1952 W. KOHLHAGEN 2,587,048
MACHINE FOR BALANCING BALANCE WHEELS AND THE LIKE
Filed March 8, 1950 4 Sheets-Sheet 1

Walter Kohlhagen
Inventor
By Seymour, Earle & Nichols
Attorneys

Feb. 26, 1952  W. KOHLHAGEN  2,587,048
MACHINE FOR BALANCING BALANCE WHEELS AND THE LIKE
Filed March 8, 1950  4 Sheets-Sheet 2

Walter Kohlhagen
Inventor
By Seymour Earle + Nichols
Attorneys

Feb. 26, 1952  W. KOHLHAGEN  2,587,048
MACHINE FOR BALANCING BALANCE WHEELS AND THE LIKE
Filed March 8, 1950  4 Sheets—Sheet 3

Walter Kohlhagen
Inventor
By Seymour, Earle & Nichols
Attorneys

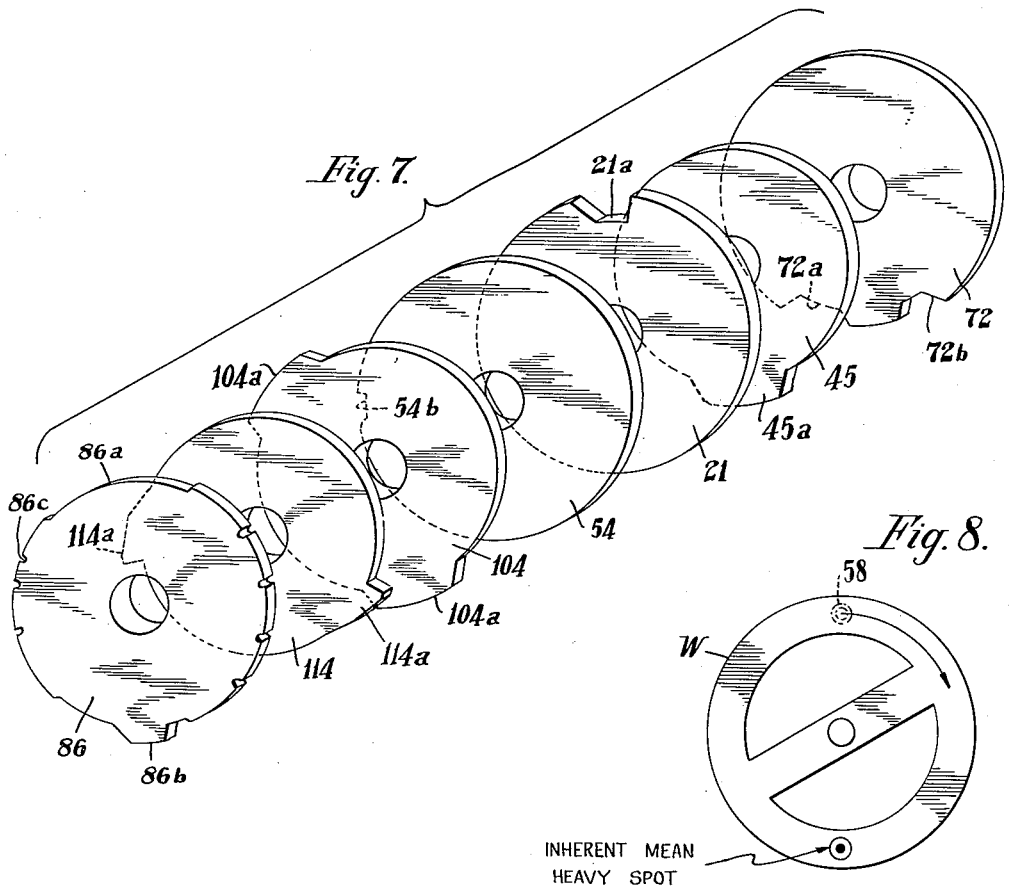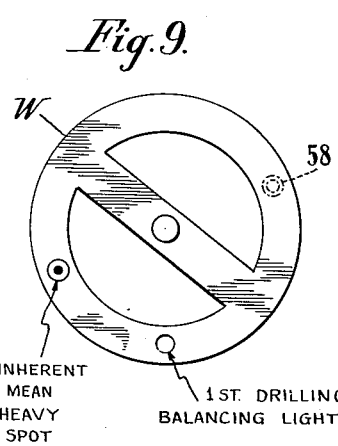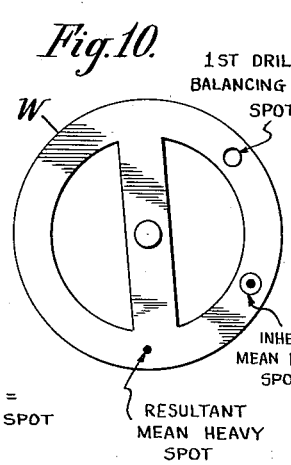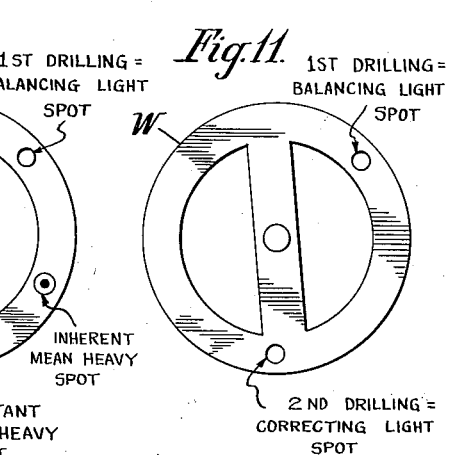

Patented Feb. 26, 1952

2,587,048

UNITED STATES PATENT OFFICE 2,587,048

MACHINE FOR BALANCING BALANCE WHEELS AND THE LIKE

Walter Kohlhagen, Elgin, Ill.

Application March 8, 1950, Serial No. 148,429
In Great Britain September 1, 1948

15 Claims. (Cl. 77—5)

This invention relates to a machine or mechanism for use in the poising or balancing of balance wheels of clocks, scientific instruments and the like; and also for poising or balancing other rotational or oscillating bodies or members such as wheels, disks, axles, staffs or equivalent axial bearing-means, etc. The aforesaid bodies or members, for convenience, are hereinafter referred to as "wheels."

One object of the invention is to provide means for expediting the balancing of wheels and enabling the operations to be effected by relatively unskilled labor and without making measurements or judging the unbalance of a wheel.

Another object of the present invention is to provide a machine wherein the operations resulting in the balancing of a wheel within a permissible error are effected automatically such that a high output of suitably balanced wheels is attainable.

Another object is to provide a machine of the kind indicated, whereby the human element is eliminated in the balancing processes, the machine including the optional provision of means for expediting and bringing to balancing rest a wheel and/or applying a turning movement to a wheel through a predetermined or known angle.

A salient object of the invention is the provision of a machine of the kind indicated having a single cutter to make all of the cuts essential to balancing a wheel.

Another important object is to provide a machine having a single poising-and-cutting station and a single cuting-means to effect all of the operations essential to the balancing of a balance wheel.

Another object is the provision of a machine for balancing balance wheels, having staff-gripping and releasing-means to effect intermittent stoppages and damping.

A still further object is to provide a machine of the kind indicated, having means assuring a plurality of stoppages of the balance wheel during the operating cycle and at progressively-diminished time-intervals.

An additional object is the provision of a machine for balancing balance wheels, having special means to prevent rebound of balancing wheels in the feeding-chute.

The invention contemplates the provision of means whereby calculations or measurements by the operative are avoided and a highly-skilled operation may be carried out by unskilled labor.

According to the invention, the automatic machine may be constructed to carry out one or other of several known balancing methods, but one preferred form of the machine is directed to carrying out balancing operations for the production of a balancing light spot, each balance wheel or other member being rotated to the predetermined angle or degree, which, for instance, may be 60°, from the inherent mean heavy spot of such wheel. The balancing method preferably employed with the machine of this invention is substantially the same as that described in my co-pending application, Serial No. 115,027, filed September 10, 1949, now Patent No. 2,554,033, dated May 22, 1951, for Methods for Balancing Oscillating or Rotating Members.

The machine includes mechanism to which wheels for balancing are fed in succession, including a poising-and-drilling station, locating guideways, and means for releasing each balance wheel from the mechanism when balancing has been effected. There is also included axially-displaceable balance-staff bearing-means at the said station with means for adjusting the said bearing-means for permitting wheel rotation and releasing the balance-wheel staffs, a drilling device aligned with the point predetermined for making light spots, and a series of motor-driven cams or equivalent means for automatically actuating the various parts in timed relation.

It is preferred to incorporate in the machine, means for engaging the wheel or other member and imparting rotation thereto through a predetermined angle in association with the production of a balancing light spot. The said means may also be utilized to positively rotate the wheel through a known angle to expedite a poising operation.

According to one form of the invention, a crank-pin member having its axis parallel to the axis of the wheel-staffs is advanced to engage the wheel-rim, for imparting partial rotation to a wheel when the crank-pin is partially rotated about the axis of the bearing-members.

It is also preferred to embody in the device, feed-means for keeping the mechanism supplied with a succession of wheels. According to one arrangement, a gravity-chute is provided for successively feeding the wheels to the mechanism, which may include a gate or escapement mechanism therein; whereby a wheel is admitted thereto from the chute only when the preceding wheel has been balanced and released.

For removing metal by the cutting or drill method, a hole or recess may be drilled or otherwise cut to a predetermined depth in the wheel-rim irrespective of the thickness thereof, and for this purpose an axially-adjustable drill, operating through a longitudinally-displaceable bushing, is provided and arranged to operate in conjunction with a backing-abutment for the rim of the balance wheel. The bushing is resiliently brought into contact with the wheel-rim, a spring being provided between a part on the bushing and a fixture, and a stronger spring between the bushing and the drill-spindle or chuck, so that in advancing the spindle, the bushing is first pushed forward, followed by the drill.

For convenience, hereinafter certain operations will, in general, be designated as "drilling."

A further object and feature of the invention is the provision of means to accommodate balance-staffs of irregularly-manufactured length.

Other objects and advantages will appear to those skilled in the art from the following, considered in conjunction with the accompanying drawings.

In the accompanying drawings, in which certain modes of carrying out the present invention are shown for illustrative purposes:

Figs. 4 and 5 are detail views showing in longitudinal section and end elevation respectively, the spindle carrying the rear bearing for wheel poising;

Fig. 6 is an enlarged fragmentary elevational and more or less diagrammatic view of the front and rear wheel-poising bearings and wheel-rotating means, and showing a balance wheel in position for operations thereon;

Fig. 7 is an exploded detail perspective view showing the cams in position for their normal sequence of operating functions but detached from the cam-shaft for clarity of illustration;

Figure 1:
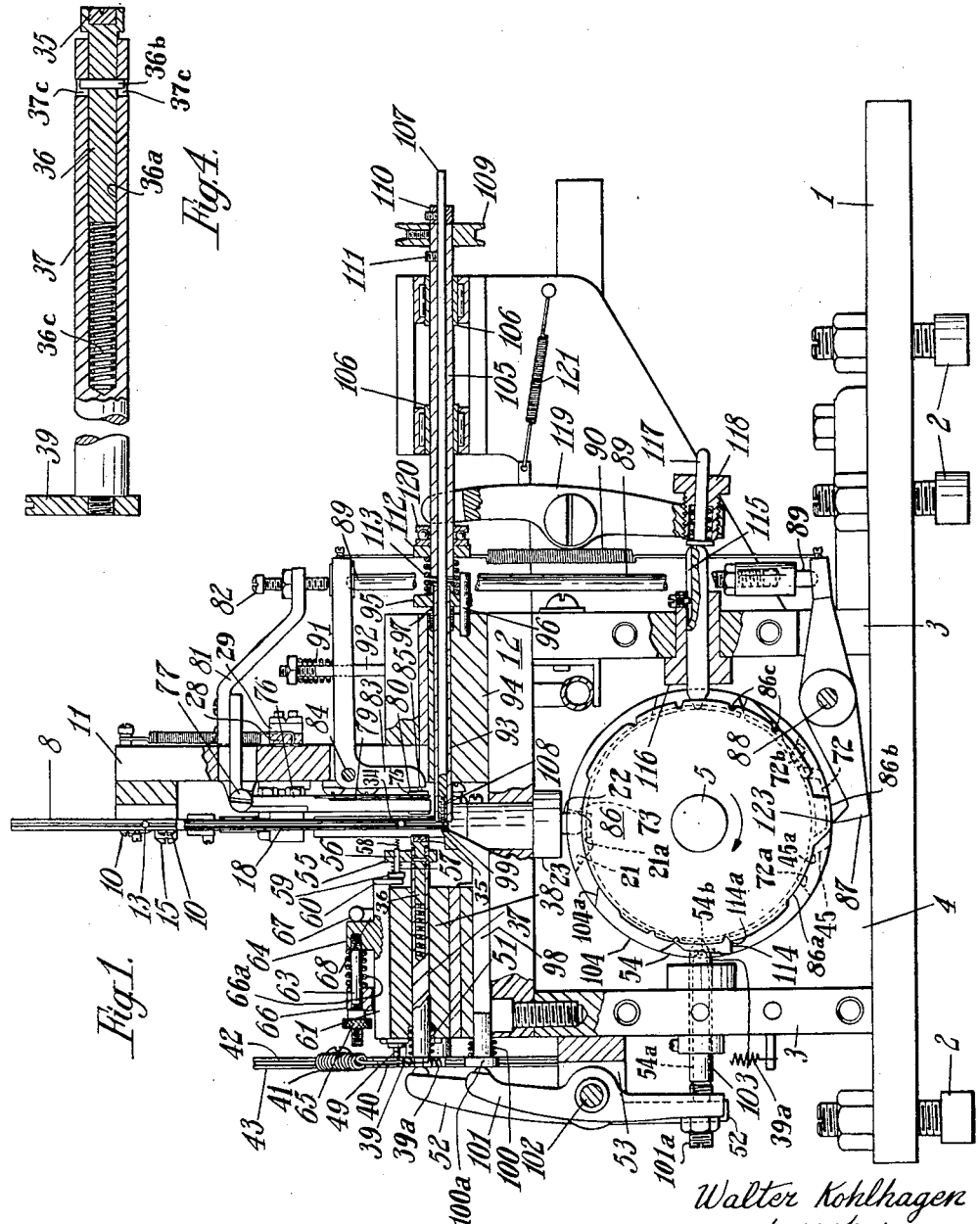
Fig. 1 is a sectional side elevation of a machine for balancing wheels constructed and arranged in accordance with the present invention, the section being taken along the axes of the wheel-bearings and drill on line 1—1 of Fig. 3.

Figs. 8 to 11 inclusive are schematic views of a balancing wheel showing progressively the sequence of operations effected by the machine in balancing a balance wheel or other member; and Fig. 12 is a fragmentary elevational view looking in the direction of the arrows 12—12 of Fig. 6.

In carrying the invention into practice according to one mode, described by way of example, as applied to operating upon the balance wheels of clocks, watches and the like, to effect a balancing thereof within a permissible error, a suitable stand and supporting structure for the various parts of the machine is provided, the stand comprising a base 1 on adjustable feet 2 and having side plates 3 and end plates 4. The end plates 4 carry a cam-shaft 5 which is driven through a worm wheel 6 and worm 7 from a suitable electric motor or other source of power (not shown).

The cam-shaft 5 has secured thereon a series of cams cooperating with cam-followers operatively connected to the several members or mechanisms they are adapted to actuate in the required timed relation one to another to follow out a predetermined cycle. Certain of the cams may be devoted to effecting the operations of a single member, while another or others may conveniently be utilized to control a plurality of members. The cams may be single acting and the return movement of the members which they operate may be effected resiliently as illustrated, by way of example; or in any other suitable manner.

On the upper part of the machine, a chute is arranged and down which a column of wheels (only one of which is shown and indicated generally at W), is adapted to pass to be operated upon. The said wheels are fed in succession under gravity action. The chute comprises a pair of oppositely-disposed channel-shaped members 8 and 9 for accommodating the rims of the wheels so that they run on edge from the in-feed; i. e., the upper end of the chute to the lower end thereof.

The chute-members 8 and 9 are secured by screws 10 to an upright 11 mounted on the top 12 of the stand. Adjacent the lower end of the chute retractable stop-means, which function in the manner of an escapement, are provided for arresting the column of wheels and releasing the wheels, one by one, from the lower end of the chute-members 8 and 9 to the feed-means located beneath the chute, as more fully described hereinafter. The chute-members 8 and 9 may be spaced or separated, as shown, for accommodating or affording a clearance for the staffs of the wheels as they move down the chute. The stop-means above referred to consists of a spring-loaded retractable cut-off-pin 13 mounted in the chute-member 8 and which normally protrudes into the channel of the chute-member 8, to thus temporarily retain the wheel adjacent the lower end of the chute until such time as the pin 13 is retracted to release the lowermost wheel for passage from the chute, as will hereinafter appear. The cutoff-pin 13 is normally urged into its outermost or wheel-releasing position by a helical spring 13a, which also retains the outer end of the pin 13 seated against the adjacent end of a lever 14 for actuation thereby into its cut-off position, as will hereinafter appear. The lever 14 is pivotally mounted on a screw 15 and carries at its lower end, an abutment-screw 16.

The feed-means above referred to comprises a pair of channel-members 17 and 18, arranged vertically and in opposed spaced parallelism and constituting a guideway in substantial alignment with and directly beneath the chute-members 8 and 9. The channel-members 17 and 18 are spaced apart to permit the passage of the respective staffs of the wheels between the said members. Each of the channel-members 17 and 18 is respectively mounted intermediate its respective opposite ends on one of the offset pivots 19 and 20 (parallel with the wheel axis) in such wise that the said members are capable of a slight rocking action transversely to the axis of the wheel-staffs.

The channel-members 17 and 18 are also linked together, as described more fully hereinafter, whereby under cam action their lower portions move slightly apart or open for the release of a completed wheel, while their upper ends approach one another temporarily to check a wheel released from the chute-members 8 and 9 by the retraction of the cutoff-pin 13, and maintain the said wheel in waiting, upon the upper ends of the channel-members 17 and 18, until the return or closing movement of the lower ends of the channel-members 17 and 18 takes place; whereupon, the rim of the said wheel in waiting will ride down the channels of the channel-members 17 and 18 to a position adjacent the lower ends thereof.

The aforesaid channel-members 17 and 18 are adapted to retain control of the rim of each wheel from its upper or in-feed end to its lower or discharge end in such a manner that the horizontal plane of the respective staffs of the wheels is preserved throughout the length of travel of the said wheels.

Figure 2:
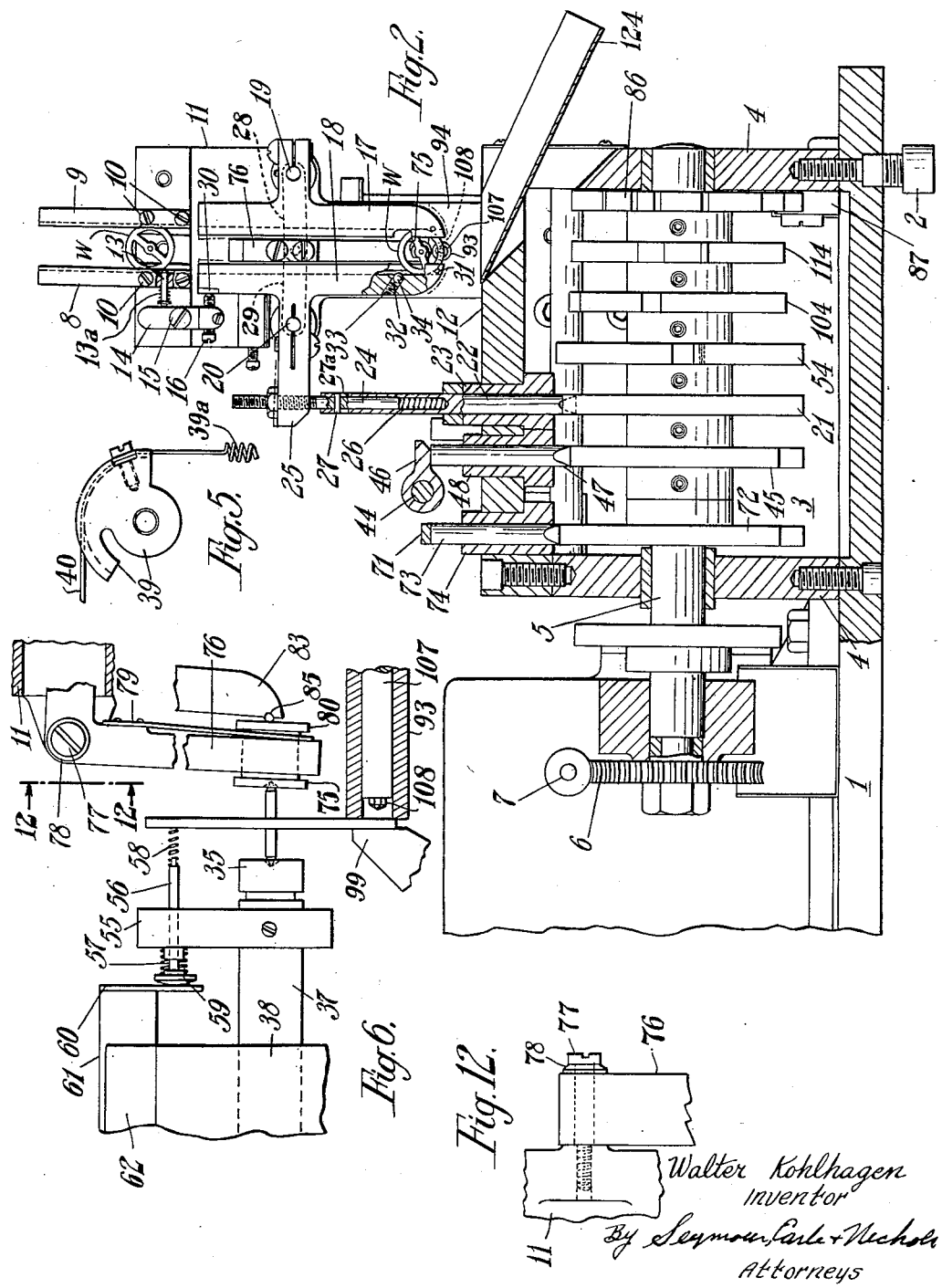
Fig. 2 is a sectional end elevation of the machine, the section being taken along the axis of the main cam-shaft on line 2—2 of Fig. 3 and showing, by way of example, a balance wheel in the chute and in position for release by the escapement-means, and another balance wheel in the guideway at the poising-and-drilling station in position for drilling and balancing operations.

A cam 21 mounted on the shaft 5 and having a recess 21a actuates a follower 22 (Figs. 1 and 2) slidable in a bearing 23. In a bore in the upper end of the follower 22 is yieldingly slidably mounted a stem 24 adjustably connected to the arm 25 of the channel-member 18 and loaded by a spring 26. A cross-pin 27 on the stem 24 slides in a slot 27a in the bore of the follower 22.

The construction just described provides a yielding connection between the cam 21 and the arm 25 of the channel-member 18 and serves to prevent damage to the feed-means and associated parts in the event of jamming or malfunctioning. A lever 28 (Fig. 2) has one end rigidly connected with the pivot 19 of the channel-member 17 and its free end, in turn, is connected to one end of a lever 29, the opposite end of which is rigidly secured to the pivot 20 of the channel-member 18 so that the two channel-members can be rocked in unison, as previously described and as will more fully hereinafter appear, under the control of the cam 21. The rocking of the channel-members 17 and 18 is effected when the follower 22 drops into and out of the recess 21a of the cam 21. The abutment-screw 16 carried by the lever 14 mentioned above, engages a bearing-surface 30 on the channel-member 18 so that the cutoff-pin 13 will be actuated simultaneously with rocking motions of the channel-members 17 and 18 for the purpose as will hereinafter appear.

Adjacent the lower end of the channel-members 17 and 18, a single poising-and-drilling station is provided for poising and balancing a wheel. The wheel, upon traveling the length of the channel-members 17 and 18, is arrested and located at the said station by the engagement of its rim with a pair of stop-pins 31, one of which is located in and extends across the respective channel of each channel-member 17 and 18. In order to prevent the wheels bouncing when they meet the stop-pins 31, a gravity ball-device is provided in one (or both) of the said channels in a position above the horizontal diameter of a wheel. In the arrangement shown, a bore 32 is drilled in the channel-member 18 at approximately an angle of about 45° to the horizontal, and which opens into the channel of the said channel-member, the outer end of the bore being closed by a plug 33. The forward or inner end of the bore 32 is of slightly-reduced diameter so that a portion of the spherical surface of a ball 34 (such as a ball bearing) protrudes into the channel and into the path of travel of the wheel. As the wheel drops down the channel-members 17 and 18, the said wheel on passing the ball 34 pushes the said ball aside against the action of gravity, and the said ball immediately returns to engage the wheel-rim and checks any bounce of the wheel.

In alignment with the respective ends of the staff of a wheel "W" when located by the stop-pins 31 at the aforesaid station, are staff-bearing means for supporting a wheel in such a manner that at one time it is free to rotate under gravity (or be otherwise rotated), so that its inherent mean heavy spot may move to the lowest point under the axis of the wheel; while at another time, the bearings are clamped or closed upon the respective ends of the staff for the purpose of applying a braking or damping action on the rotational swing of a wheel and during the drilling operation to secure the staff of the balance wheel in a fixed position.

A rear bearing-member 35, adapted to receive one end of a wheel-staff, is carried by a stem 36 slidably accommodated in an elongated pocket 36a formed in a spindle 37. The stem 36 is prevented from rotational movement and limited in its axial movement by a pin 36b projecting diametrally through the stem and having its opposite ends located in a pair of opposed narrow slots 37c—37c provided in the cylindrical wall of the said spindle. The stem 36 is yieldingly urged or biased axially outwardly to the extent afforded by the travel of the pin 36b in the aforesaid slots 37c—37c, by a spring 36c confined in the pocket 36a and between the adjacent inner end of the stem 36 and the bottom of the said pocket. The spindle 37 is reciprocable and rotatable in a bearing-block 38 and has attached to its rear end an actuating-segment 39 (Fig. 5) having a peripheral groove in which is attached one end of a cable 40 (Fig. 3) connected by a coil spring 41 to a second cable 42 secured to the grooved periphery of a wheel 43 mounted on a shaft 44.

A cam 45 having a "high dwell" or prominence 45a is secured to the cam-shaft 5 and is formed to actuate a lever 46 through a follower 47 mounted in a bearing 48. The lever 46 is rigidly secured to the shaft 44 above referred to and, by this means, the wheel 43 and hence the segment 39 is rotated at the required times. The action of the cam 45 becomes effective when the follower 47 passes over the prominence 45a. It will be understood that, if desired, the length of the prominence 45a may be varied to provide the desired angular or turning movement of the wheel "W" or other member, for the purpose as will hereinafter appear. The rotation of segment 39 is limited by pins 49 and 50 which engage abutment-surfaces formed thereon. The position of the pin 49 is preferably adjustable and when the segment 39 abuts this pin, the spring 41 on the cable is stretched as the wheel 43 completes its motion as determined by the cam 45. To return the segment 39 to its normal position, a spring 39a (Figs. 1 and 5) is provided, one end of which is secured to the segment 39, while the opposite end is secured to the adjacent side plate 3. The said spring 39a normally yieldingly holds the segment 39 seated against the stop-pin 50.

Figure 3:
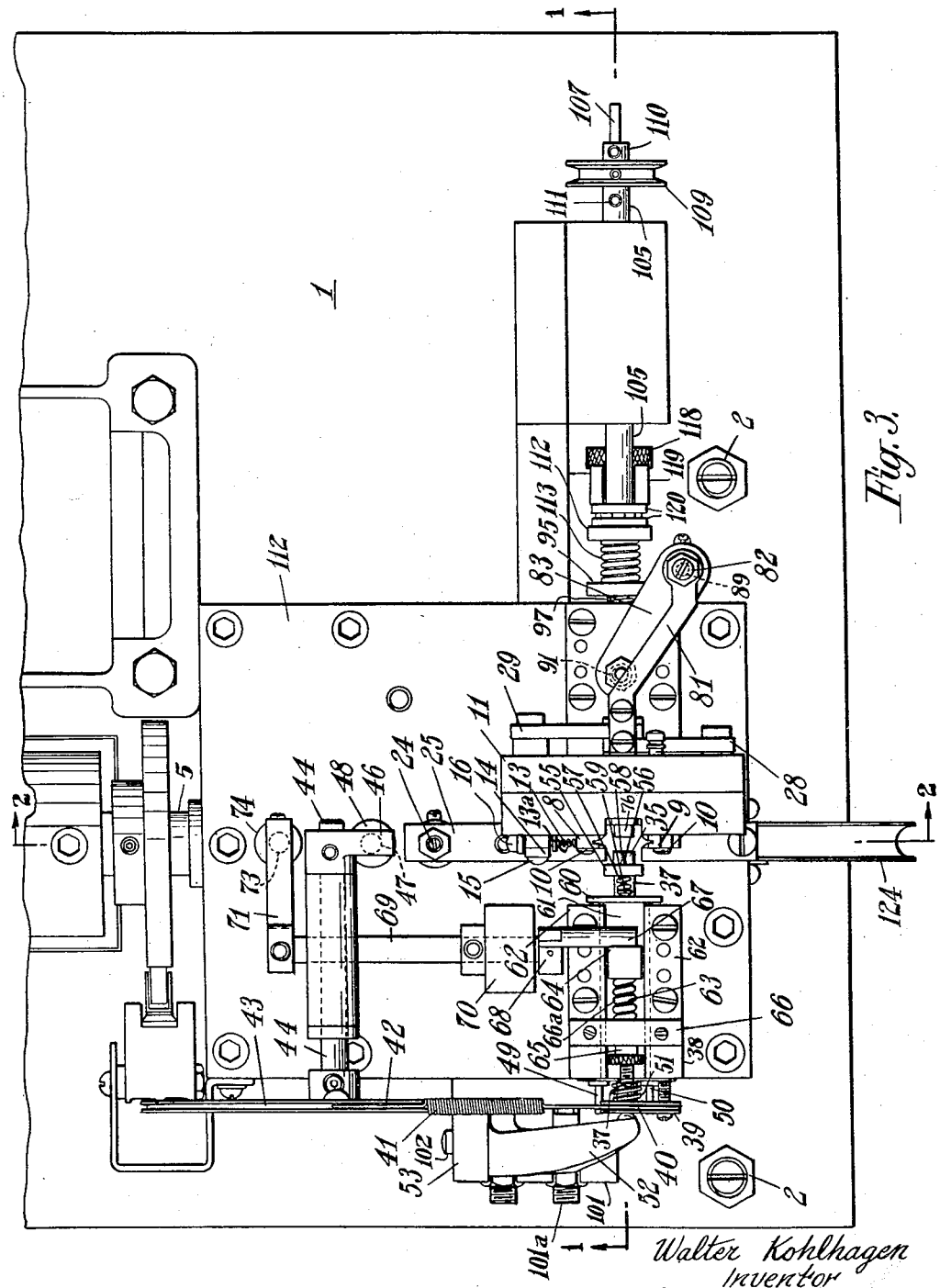
Fig. 3 is a plan view of the machine.

The spindle 37 is normally held in its retired position by a helical spring 51 interposed between the segment 39 and the adjacent side of the bearing-block 38. Endwise motion, as will later appear, is imparted to the spindle 37 by a rocker-arm 52 pivoted intermediate its opposite ends at 102 in a block 53 and actuated by cam 54 through a follower 54a. The operating action of the cam 54 becomes effective when the follower 54a drops into and out of the recess 54b of the said cam. The spindle 37 has rigidly secured thereto at its inner end, for concurrent rotation therewith, a crank-arm 55 which carries at its outer end a pin 56 loaded by a spring 57 for axial sliding movement. The pin 56 is provided at its inner end with a spring 58 or resilient pad for engaging, under cam control, the rim of a wheel in position at the poising-and-drilling station. The rear end of the pin 56 has an abutment-head 59 against which the spring 57 bears, the opposite end of which thrusts against the adjacent face of the crank-arm 55. The pin 56 is axially moved to engage the rim of a wheel by a transverse plate 60 on a slide 61 mounted to move parallel with the axis of the spindle 37 in the guides 62. Movement of the slide 61 toward the wheel is limited by a pin 63 attached to a lug 64 carried by the slide. The pin 63 has threaded on its outer end a nut 65 engaging behind a fixed bracket 66 secured to the guides 62, 62 and through which the pin 63 passes with a free sliding fit. A spring 66a is interposed between the lug 64 of the slide 61 and the said bracket 66. The said spring urges the slide 61 to move inwardly to engage the spring 57 with the rim of a wheel. The slide 61 is, however, normally held in its retired position against the urge of the spring 66a by an extension 67 on a crank-arm 68 carried on a shaft 69 supported in a bearing 70 and carrying at its opposite end a lever 71 (Fig. 3).

A cam 72 having a pair of recesses 72a and 72b is secured on the cam-shaft 5 and actuates a follower 73 mounted in a bearing 74, the follower 73 engaging the outer end of the lever 71 to retire the slide 61, as will later appear. The slide 61 is moved forward under the urge of the spring 66a above described so that the plate 60 thrusting against the head 59 of the pin 56 will cause the spring 58 of the latter to yieldingly engage the rim of a wheel, the said spring 58 preventing damage to the wheel. During this forward movement of the slide 61, the extension 67 of the crank-arm 68 is retired in advance of the slide 61 under the control of the cam 72, thus rotating the shaft 69. The movement of the shaft 69 and the parts carried thereby is effected as the follower 73 drops into and moves out of the depressions 72a, 72b in the cam 72. The retiring of the slide 61 to allow the disengaging of the spring 58 from the rim of a wheel is also effected by the cam 72 which moves the follower 73 outwardly to thereby rotate the shaft 69 and cause the extension 67 of the crank-arm 68 to thrust the slide 61 rearwardly against the urge of the spring 66a and to hold the slide in its retired position. These movements will be better understood from a consideration of Figs. 3 and 6.

The axially-movable front bearing 75 for the staff of the wheel is adapted to be moved into firm engagement with the adjacent end of the staff and then set back a small fraction to release the staff of a wheel to allow the wheel to turn by gravity. The said front bearing 75 is carried at the lower end of a long lever-arm 76, in order that the bearing shall have a substantially-straight line movement. The pivot 77 of this lever-arm 76 includes a friction-washer 78 which controls its motion so that when the lever 75 is displaced, it tends to retain its position until positively moved therefrom.

The front bearing-member 75 is arranged to have limited axial movement in the lower end of the lever-arm 76, the movement being of the order of a few thousandths of an inch. A leaf spring 79 mounted on the lever-arm 76 engages an abutment-head 80 on the bearing-member 75 and tends to resiliently retain it in retracted position away from the staff it is intended to engage. The lever-arm 76 has secured thereto a second arm 81 carrying at its outer end a stud 82. A bell-crank lever 83 pivoted at 84 has an abutment or nose engagement at 85 with the head 80 of the front bearing-member 75, and the top of its other end is engaged by the stud 82 of the arm 81.

A cam 86 on the cam-shaft 5 is engaged by one end of a rocker cam-follower 87 (Fig. 1) pivoted at 88 and having its opposite ends engaging the lower end of an adjustable connecting-rod 89, the upper end of which abuts the lower side of the adjacent end of the lever 83. The cam 86, as best illustrated in Fig. 7, has a land or dwell 86a, a prominence 86b and a plurality of recesses 86c, the latter being arranged over a portion of the edge of the cam and having a radius intermediate the dwell-portion 86a and the prominence 86b and at progressively-diminished intervals, for a purpose that will hereinafter appear. Engagement of the connecting-rod 89 with the lever 83 is ensured by a spring 90 connected to the bell-crank lever 83 and the cam-follower 87, and the lever 83 is urged downwardly by a spring 91 on a fixed stem 92 and thrusting against the upper face thereof.

When the lever 83 is rocked by the spring 91 as the cam 86 rotates, its first action is to give the bearing-member 75 its marginal inward movement in the lever-arm 76. This movement bends the leaf spring 79 into engagement with the adjacent face of the lever-arm 76. Continued swinging movement of the lever 83 will displace the lever-arm 76 and the bearing-member 75 toward the adjacent end of the wheel-staff. In this manner, the staff will be firmly engaged by the bearing-member 75 and when the cam 86 releases the lever 83, the pressure of the latter on the bearing-member will be relieved, following which the leaf spring 79 will retract the bearing-member 75 through its marginal movement, above mentioned, thereby freeing the wheel for turning movement.

It will be understood that the friction at the pivot 77 is greater than the strength of the leaf spring 79 so that when the lever 83 engages the head 80 of the bearing-member 75, the latter moves forward to take up the clearance between the lever-arm 76 and the leaf spring 79, after which the lever-arm 76 moves until the bearing-member 75 is pressed against the staff. The lever 83 is then moved back slightly to relieve the pressure and the bearing-member 75 is also moved back by the leaf spring 79 and relieves the pressure on the staff of the wheel.

In connection with the operation of the cam 86, it may be pointed out that when the follower 87 is engaged with the prominence 86b, the bearing 75 will be in retracted position or "wide open." When the follower engages the land or dwell 86a, the bearing-member 75 is moved inwardly to apply pressure on the staff of a wheel and at other intermediate radius-portions of the periphery. With the exception of the recesses 86c, the bearing-member 75 is free to turn. The indentations 86c are designed and adapted to apply pressure or dampen the oscillations of the wheel at progressively-diminished intervals in order to quickly bring the wheel to an "at rest" position.

*Drilling or metal-removing mechanism*

The removal of metal for the balancing operation in the present instance is by the use of a drilling mechanism and, accordingly, a bushing 93 having an axial drill-receiving bore is slidably mounted in a suitable supporting-bearing 94 with its axis aligned with the selected spot on the rim of a wheel held in position by the bearing-members 35 and 75. In the present instance, this spot is located vertically below the axis of the said bearing-members.

The bushing 93 carries a collar 95 rigidly secured thereto at its outer end and which is slotted and guided on a fixed pin 96 mounted in the bearing 94, and a spring 97 normally urges the bushing 93 away from engagement with the rim of a wheel, suitable cam-means being provided for advancing the bushing into engagement with the said wheel at the proper time.

Cooperating with the bushing 93 for the drilling operation, a backing-abutment is provided to contact the rear of a wheel-rim to take the thrust of the bushing 93 and the drill. This backing-abutment is in the form of a slidable abutment-member 98 having at its forward end an abutment 99. The abutment-member 98 is mounted in a suitable slideway below the supporting-means for the rear bearing-spindle 37. The slidable abutment-member 98 is urged outwardly away from the wheel by a spring 100, the head 100a of the sliding abutment-member being engaged by the ball-nose of a rocker-arm 101 pivoted at 102. The lower end of the rocker-arm 101 carries an adjustable stud 101a engaging a follower 103 which is actuated by the cam 104 on the cam-shaft 5, the action of the cam becoming effective when its prominences 104a—104a are engaged by the follower 103.

It may be mentioned that the rocker-arm 52 previously referred to, is arranged and actuated in a similar manner, but by the cam 54.

A drill-holder bushing 105 is slidably and rotatably mounted in bearings 106 in axial alignment with the bushing 93 and carries a drill-holder 107 having a drill 108 secured in its forward or inner end. The drill-holder bushing 105 carries a pulley 109 at its outer end by which the said drill-holder bushing and the drill-holder and drill can be rotated from any convenient driving-means. A collar 110 is secured to the drill-holder and abuts the end of the bushing 105 in which the drill-holder 107 is secured for rotation therewith by a set screw 111. This allows the drill-holder 107 to be adjusted longitudinally in the bushing 105 and affords a convenient means for determining the depth of the hole to be drilled in the rim of a wheel, irrespective of the thickness of said rim. To enable the drill 108 to be advanced, the drill-holder bushing 105 carries a collar 112 and a spring 113 interposed between this collar and the collar 95 on the bushing 93. The spring 113 has a greater resistance than the spring 97 which retracts the bushing 93.

A cam 114, on the cam-shaft 5, actuates a follower 115 slidable in a bearing 116, the effective action of this cam taking place as the follower 115 engages the prominences 114a—114a of the said cam. The follower 115 engages the head of a spring-loaded pin 117 slidable in a bearing 118 adjustably secured in the lower end of a rocker-arm 119. The bifurcated upper end of the rocker-arm 119 engages the collar 112 on the drill-holder bushing 105 through the medium of a thrust-bearing 120. A spring 121 acts on the rocker-arm 119 to hold the head of the pin 117 against the cam-follower 115 and the latter against the cam 114. The arrangement is such that the cam 114 controlling the drilling operation will advance the bushing 105 and through the spring 113, yieldingly advance the bushing 93 and will first cause the inner end of the latter to be protruded against the rim of a wheel, while, at the same time, the nose of the abutment-member 98 will be moved inwardly and engages the rear of the said wheel. This movement of the bushing 105 and drill-holder 107 will continue after the bushing 93 has engaged the rim of a wheel and causes the drill-holder and drill, which are continuously rotated, to be further advanced to drill a hole in the rim of a wheel, for the purpose as will hereinafter appear.

When the cam 114 releases the drill assembly, the parts return to their normal position with the bushing 93 and drill retracted and the abutment-member 98 withdrawn from the wheel. The spring-loaded pin 117 in the rocker 119 allow for full travel of the cam-follower 115 after the drill-holder has reached the limit of its travel, when the front face of the drill-holder bushing 105 abuts the rear face of the bushing 93, thus permitting the drill to enter the wheel by a predetermined amount.

Damping, as already indicated, is conveniently applied through pressure imposed by the bearing-members 35 and 75 on the wheel-staff, and the actuating-cam 86 for the bearing-member 75 includes the previously described cam-profiles, the recesses 86c of which are engaged by the reduced end 123 of the rocker cam-follower 87 which temporarily and intermittently apply end-wise pressure upon the staff of a wheel at progressively-diminished intervals of time in the swing and/or as a heavy spot is approaching its position of rest, thus checking useless oscillation which would normally occur.

*Operation*

Assuming a source of power has been connected to the machine and that the worm wheel 6 and worm 7 are effecting the rotation of the cam-shaft 5, having the seven cams fastened thereto, as described above, and that the machine is set up for use in carrying out a method involving a rotation of the wheel from the position where the inherent mean heavy spot is vertically under the axis of the wheel, to a position in which a hole is drilled to establish a predetermined balancing light spot, which may be, for example, an angle of 60° from such heavy spot, a series of balance wheels for balancing is fed down the chute, the lower part of which is represented by the opposed channel-members 8 and 9. It will be understood that these members may conveniently be continued upwardly at a suitable small inclination to the horizontal so that the wheels roll down them in edgewise relation under gravity from a supply. The first or lowermost wheel is arrested by the cutoff-pin 13 at the end of the chute. Assuming that the channel-members 17 and 18 have been rocked about their pivots to bring their lower ends into wheel-releasing position, the upper edges thereof are correspondingly brought inward and the cutoff-pin 13 in the chute is withdrawn as previously described, to release the lowermost wheel. This wheel will drop onto the top of the contracted channel-members 17 and 18 and pause in this position until the upper edges of the said channel-members 17 and 18 open upon the closing of the lower portions of the said channel-members by operation of the cam 21 in conjunction with its follower 22 and parts associated therewith, and which occurs as the follower 22 drops into the recess 21a of the cam 21. When this action takes place, the said balance wheel will slide down the channel-members 17 and 18 and will be arrested by the stops 31—31. In arriving at this position, the wheel will pass the gravity ball-device 34 and any bounce or upward tendency of the wheel will be arrested.

The cams 54 and 86, in conjunction with their followers 54a and 87 and associated parts operating the rear and front bearing-members 35 and 75 respectively, then actuate these members to move them to firmly engage the staff-ends, as previously described, and after the channel-members 17 and 18 have opened under the control of the cam 21, to free the wheel, the frictional retraction of the bearing-member 75 (the marginal amount specified) takes place as the nose 123 of the follower 87 rides up onto the intermediate radius of the cam 86. The wheel is thus free for orientation so that the latter will commence rotation to come to a position of balance with the inherent mean heavy spot vertically under the staff-axis (Fig. 8).

Continued turning movement of the cam 86 will cause the nose 123 of the follower 87 to successively engage the recesses 86c of the said cam to cause the bearing-member 75 to intermittently press against and release the staff of the balance wheel, to apply damping pressure to the said staff, so that rotation of the wheel is periodically checked or damped. Thus, the wheel is rapidly brought to rest with its inherent mean heavy spot under the staff-axis. When the wheel is thus positioned, the dwell 86a of the cam 86 effects the movement of the bearing-member 75 again into its firm gripping engagement with the staff of the wheel to thus securely hold the said wheel in position until such time as the bearing-member 75 is partially retired. When the wheel has come to rest with its inherent mean heavy spot under the staff-axis, as just above described, the cam 72, in coaction with its follower 73 and parts associated therewith, functions to allow the extension 67 to be retired under the urge of the spring 66a, the latter moving the slide 61 inwardly to engage the spring 58 with the adjacent portion of the balance-wheel rim. The cam 45, in turn, now effects through mechanism associated therewith and described above, the turning of the rear bearing-member 35 and its attached crank-arm 55, to cause the pin 56 and spring 58 carried thereby to turn the balance wheel about the axis of its staff, as indicated in Fig. 9. The partial positive rotation now given to the balance wheel displaces its inherent mean heavy spot and rotates the wheel through a predetermined angle, preferably between 60° and 85°, in order to carry out the general method hereinbefore indicated. The cam 72 by means of the crank-arm 68 and associated parts now effects the retiring of the slide 61 and the consequent disengagement of the spring 58 from the wheel.

When the predetermined point on the wheel for the production of a balancing light spot has reached the drilling position, the cams 104 and parts associated therewith operate to thrust in the abutment-nose 99, while cam 114 becomes effective to advance the bushing 105 and drill 108 as previously described. This movement will cause the wheel to be gripped between the abutment-nose 99 and the spring-pressed bushing 93 prior to the drill 108 engaging with the wheel. Immediately following the said gripping, a hole is drilled in the rim of the wheel to a depth predetermined (by the adjustment of the drill-holder), irrespective of the thickness of the rim of the balance wheel (Fig. 9). The abutment-nose 99 preferably engages the balance wheel slightly before the drill-holder bushing 105 engages the said wheel. The drilling of the wheel-rim will form a balancing light spot at this point (Fig. 9), resulting in a diametrically-opposite balancing heavy spot.

Just prior to the above described gripping of the wheel by the parts 93 and 99, pressure is brought to bear, through the cams 54 and 86, upon the wheel-staff by the bearing-members 35 and 75, so that the wheel is incapable of turning movement or axial displacement and the axis thereof is definitely aligned with the axes of the bearing-members. When the hole has been drilled, the bushing and drill are retracted by action of the cam 114 and the elements hereinbefore mentioned, and the abutment-nose 99 is withdrawn by action of the cam 104. The pin 56 and its spring 58 is now again engaged with the rim of the wheel (while pressure is still maintained by the bearings 35 and 75), and the spindle 37 turned back to its normal original position by the action of the cam 45, to thus again positively rotate the wheel in a direction opposite to the rotation previously described. It is preferred to positively rotate the wheel at this time to speed up the operation of reorienting its resultant mean heavy spot in position beneath the staff-axis. This turning of the wheel will assure the resultant mean heavy spot being sufficiently removed from the vertical axis of the wheel to quickly cause the wheel to oscillate upon the removal of endwise pressure on the wheel-staff. The pin 56 and its spring 58 is now retracted by action of the cam 72. Pressure is now taken off the wheel-staff in the manner previously described, and the wheel is free to rotate to bring its resultant mean heavy spot down to the drilling position under the staff-axis, as is shown in Fig. 10.

When the resultant mean heavy spot is in position, the cams 54 and 86 apply pressure to the bearings 35 and 75 respectively, and the drilling mechanism is again operated as above described, to again drill and remove metal to form a correcting light spot (Fig. 11) in order to effect the required balance of the wheel. It will be noted that according to the arrangement described, the same drill is used for operating upon the balance-wheel rim to drill a correcting light spot at the location of the resultant mean heavy spot, as was previously used to first drill the aforesaid balancing light spot, thereby ensuring that exactly the same amount of metal is removed on the two occasions.

Now, when the cams have caused the retraction of the drilling mechanism and the abutment-member, the operation is complete and bearing-members 35 and 75 are retired, thus releasing the wheel. A chute 124 is provided for receiving the released wheels. The cam 21 now causes the channel-members 17 and 18 to rock about their pivots, thus closing the said channels 17 and 18 at their lower ends and causing their upper edges to move into position for receiving the next wheel from the chute-members 8 and 9 when the cut-off-pin 13 in the chute-member 8 is retracted to release the lowermost wheel. Thus, the cycle of operation is completed and the machine is in readiness for repeating the said cycle.

Although according to the above-described operation of the machine, the balance-wheel rim is drilled twice, the machine may be equally utilized to effect balancing by drilling one or more additional holes.

In general, it will be noted that the machine employs only one station at which the two poising and balancing operations are conducted. The actual metal-removing, at all the spots selected, is likewise effected by a single cutter. The means employed for rotatably supporting the balance wheels also functions to intermittently stop or dampen the wheels during the operating cycle. In order to prevent possible delay in the passing of the wheels through the feeding-mechanism, a ball-check, described above, serves to eliminate rebound from the bottom of the feeding-mechanism, thus permitting each individual wheel to be quickly placed in position at the poising-and-drilling station.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a machine of the kind described, the combination of a frame; a shaft turnably supported on said frame and having a plurality of cams; a plurality of cam-followers on the frame and actuated by said cams; axially-adjustable bearing-supports arranged on the frame and effective to rotatably support a wheel; means controlled by the cams and effective to move said bearing-supports; a finger operatively connected to said means and yieldingly engageable with and disengageable from a wheel when said wheel is on the bearing-supports, said finger being effective to rotate said wheel to a predetermined position; a drill rotatably supported and slidably movable on the frame; and instrumentalities controlled by one of said cams and effective to intermittently and yieldingly apply said drill to a wheel on the bearing-supports; said means also being effective to stop the rotational movement of a wheel on the bearing-supports at progressively-diminished time-intervals.

2. In a device of the kind described, the combination of a frame; a shaft rotatably mounted on said frame; a plurality of cams on the shaft; a single poising-and-drilling station arranged on the frame, said station including yieldable bearings turnably mounted and axially movable on the frame and effective to releasably rotatably support wheels, one at a time; drilling-means turnably mounted and longitudinally slidable on the frame; a pair of guides rockably mounted on the frame and linked together, said guides being adapted to receive a wheel in operative alignment with said bearings; cam-controlled means arranged on the frame and effective to yieldingly apply the drilling-means to a wheel in said bearings; cam-controlled means angularly and translationally movable on the frame and having a resilient finger, said finger being engageable with a wheel in said bearings, certain of the cams being effective to move the bearings, and one of said cams being effective to effect the release of the wheel from the guides after the wheel has been balanced and released from said bearings.

3. In a machine of the kind described and for balancing wheels, the combination of a frame, a shaft turnably mounted on the frame, a plurality of cams secured to said shaft, power-means for operating the shaft at a predetermined rate, axially-movable bearings turnably supported on the frame and effective to support a wheel; lever-means for moving said bearings translationally; wheel-turning means connected to the frame and effective to engage and partially turn a wheel when supported on said bearings, said last-mentioned means including yielding instrumentalities; and cutting-means arranged on the frame and engageable with and disengageable from a wheel supported on the said bearings; said lever-means being effective for starting and intermittently stopping rotation of a wheel when supported on the bearings and at progressively-diminished intervals of time; said cams being effective to control the movement of all of the above-mentioned means.

4. In a machine of the kind described, a frame, a shaft rotatably supported on the frame and having a plurality of cams; a poising-and-drilling station having a pair of bearings; a spindle turnably and reciprocatingly supported on the frame, a crank-arm rotatably supported on the spindle and having a finger; means slidably supported on the frame and operative to move the finger into and out of engagement with a wheel supported between the pair of bearings; a drill turnably supported on the frame and axially movable thereon, said drill being engageable with and disengageable from a wheel supported between the said bearings; a rocker-arm mounted on the frame and effective to yieldingly apply said drill to a wheel supported on the bearings; and lever-means to intermittently move the bearings and thereby temporarily stop the rotation of a wheel thereon; said cams being effective to operate the drill and all of said means and in a predetermined sequence.

5. In a machine of the kind described, the combination of a poising-and-drilling station, said station including yieldable bearings, said bearings normally supporting a wheel rotatably therebetween; lever-means contactable with said bearings and operative to move them into positions effective to alternately permit and prevent rotation of a wheel; wheel-turning means constructed and arranged to rotate a wheel supported by the bearings; cutting-means arranged to contact a peripheral portion of a wheel supported between the bearings and remove metal therefrom; an abutment slidably engageable with the wheel approximately at the time the wheel is being operated on by said cutting-means; a rocker-arm mounted on the machine and effective for actuating said abutment, a second rocker-arm mounted on the machine and for applying said cutting-means to the wheel when on the bearings; and automatic control-means constructed and arranged to operate all of said above-mentioned means and both of said rocker-arms in a predetermined sequence.

6. In a machine for use in balancing staff-mounted wheels, the combination of: opposite combined thrust and journal bearings relatively movable into and from supporting relation with the ends, respectively, of the horizontally extending staff of a wheel, and also relatively movable, while supporting said staff ends, to lock the latter against and release them for free rotation relative to said bearings; cutting-means vertically beneath the axis of a supported wheel and adapted to remove material from the latter; first cam-operated means for turning said supported wheel to bring a first spot at an acute angular distance from the inherent heavy spot of said wheel into operative alignment with said cutting-means; and other cam-operated means operated in timed relation with said first cam-operated means for rendering said cutting-means operative on operative alignment between the latter and said first spot of said wheel.

7. In a machine for use in balancing staff-mounted wheels, the combination of: opposite combined thrust and journal bearings relatively movable into and from supporting relation with the ends, respectively, of the horizontally extending staff of a wheel, and also relatively movable, while supporting said staff ends, to lock the latter against and release them for free rotation relative to said bearings; cutting-means vertically beneath the axis of a supported wheel and adapted to move to and from cutting engagement with the latter; first cam-operated means operative to turn said supported wheel from a first position of stable equilibrium into a second position of unstable equilibrium at a predetermined acute angular distance from said first position; and other cam-operated means operated in timed relation with said first cam-operated means for moving said cutting-means into and from cutting engagement with said wheel when the latter has been turned into said second position and again when said wheel assumes a new position of stable equilibrium after the preceding movement of said cutting means away from said wheel.

8. In a machine of the kind described, the combination of spaced upright channels facing each other to form a track for the edgewise gravitational descent therein of a staff-mounted balance disc to an operating station at the lower end of said track, at least one of said channels being pivoted at a point above its lower end so that the latter is swingable toward and away from the lower end of the other channel for the widthwise contraction and expansion, respectively, of said lower track end; an obstruction in at least one of said channels near the lower end thereof adapted to stop and hold a descending disc in said track at said operating station and release it for gravity discharge from said track when the lower track end is widthwise contracted and expanded, respectively; and opposite combined thrust and journal bearings movable substantially axially of the staff of a disc in said track at said operating station into and from bearing relation with the opposite ends, respectively, of said staff.

9. The combination in a machine as set forth in claim 8, further comprising a machine tool, and means guiding said tool between said channels to and from operating relation with a disc at said operating station.

10. The combination in a machine as set forth in claim 8, further comprising a machine drill, an abutment member, means guiding said drill for longitudinal movement on one side and axially of a disc in said track at said operating station into and from cutting engagement with an exposed portion of said disc between said channels, and means guiding said abutment member for movement on the opposite side of said disc into and from abutting relation with the same exposed disc portion between said channels.

11. The combination in a machine as set forth in claim 8, further comprising a member movable at one side of a disc at said operating station into and from abutment with an exposed portion of said disc between said channels, a sleeve guided for longitudinal movement at the opposite side and axially of said disc into and from abutment with the same exposed disc portion between said channels, a power drill normally yieldingly retracted in said sleeve, and means for advancing said drill toward said disc so that said sleeve will be moved into abutment with said disc before said drill comes into cutting engagement with said disc.

12. In a machine of the kind described, the combination of an upright chute for the gravity descent therein and discharge therefrom of a column of staff-mounted balance discs in edge-to-edge engagement; spaced upright channels facing each other to form at the lower chute end a continuing track for the edgewise gravitational descent therein of a discharged disc to an operating station at the lower end of said track, at least one of said channels being pivoted intermediate its ends so that either end thereof will swing toward the adjacent end of the other track when the other end of said one track is swung away from the adjacent end of said other track, whereby the opposite track ends may alternately be widthwise expanded and contracted and a discharge disc may enter the upper track end only when the same is expanded; an obstruction in at least one of said channels near the lower end thereof adapted to stop and hold a descending disc in said track at said operating station and release it for gravity discharge from said track when the lower track end is contracted and expanded, respectively; means releasing only the lowermost disc in said chute for discharge therefrom on each contraction and subsequent expansion of the upper track end; and opposite combined thrust and journal bearings movable substantially axially of the staff of a disc in said track at said operating station into and from bearing relation with the opposite ends, respectively, of said staff.

13. In a machine of the kind described, the combination of means operative to support at an operating station a staff-mounted balance disc with its staff ends exposed, and to release said disc; a first combined thrust and journal bearing movable axially of the staff of a supported disc at said operating station into and from a position in which it is in bearing relation with one end of the staff of said supported disc; another combined thrust and journal bearing; a first pivoted lever movable toward and away from the other staff end of said supported disc and carrying said other bearing for limited independent movement toward and way from said other staff end; friction means to prevent free rotary movement of said lever; and a second pivoted lever movable toward and away from the other staff end of said disc to thrust said other bearing into bearing relation with said other staff end and permit its retraction from thrust-exerting relation with the latter, said levers being so coordinated that said second lever will, on retraction through a predetermined distance from said other bearing, engage and retract said first lever away from said other staff end.

14. The combination in a machine as set forth in claim 13, further comprising a set screw threadedly received in one of said levers and being in the path of movement of the other lever so that said second lever will, on retraction through a variable distance from said other bearing, retract said first lever away from said other staff end.

15. In a machine of the kind described, the combination of means operative to support at an operating station a staff-mounted balance disc with its staff ends exposed, and to release said disc; opposite combined thrust and journal bearings movable coaxially of the staff of a supported disc into and from bearing relation with the staff ends, respectively, in order to hold the released disc at said operating station against rotation and release the same progressively for free rotation in said bearings and for removal therefrom, respectively, one of said bearings being rotary and having a lateral extension; a pin longitudinally slidable in said extension axially of said one bearing and carrying at the end nearest the other bearing a coaxially extending helical compression spring; and a slide movable axially of said one bearing and having adjacent the other end of said pin a transverse plate which, on movement of said slide toward said other bearing into an advance position, engages said other end of the pin and pushes the latter into an operative position in which the free end of said compression spring bears against and is in frictional driving engagement with a disc held in said bearings, said plate being adapted to serve in its advance position as a track and being of such expanse that said pin may move through a predetermined angular range while sliding on and being held in its operative position by said plate.

WALTER KOHLHAGEN.

REFERENCES CITED

The following references are of record in the file of this patent:

UNITED STATES PATENTS

| Number | Name | Date |
|---|---|---|
| 407,589 | Griffin | July 23, 1889 |
| 1,491,523 | Ekstrom | Apr. 22, 1924 |
| 2,288,690 | Eddison et al. | July 7, 1942 |